Figure 1:
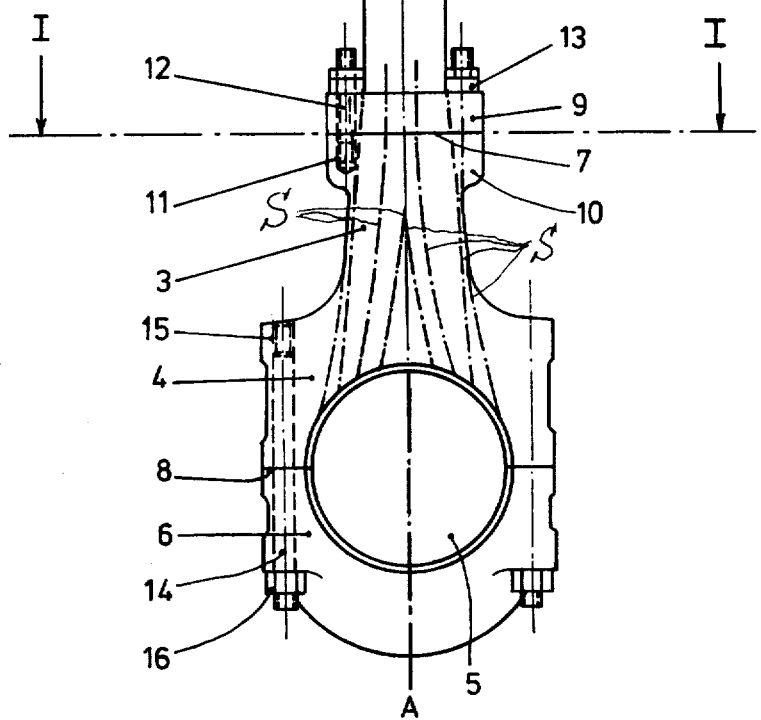

United States Patent

Ottl et al.

[11] 3,903,753
[45] Sept. 9, 1975

[54] COMPOSITE PISTON ROD FOR HIGH POWER RECIPROCATING ENGINES

[75] Inventors: Adolf Ottl, Stadtbergen; Ernst Pfleiderer, Konigsbrunn, both of Germany

[73] Assignee: Maschinenfabrik Augsburg-Nurnberg A.G., Augsburg, Germany

[22] Filed: Feb. 12, 1974

[21] Appl. No.: 441,749

[30] Foreign Application Priority Data
Feb. 15, 1973 Germany............................ 2307348

[52] U.S. Cl. ............................... 74/579 E; 403/337
[51] Int. Cl. ............................................... F16c 7/02
[58] Field of Search ........ 74/579 E, 579 R; 403/337

[56] References Cited
UNITED STATES PATENTS
3,677,107  7/1972  Strebel et al...................... 74/579 R
FOREIGN PATENTS OR APPLICATIONS
175,951  8/1921  United Kingdom................... 74/579

Primary Examiner—Samuel Scott
Assistant Examiner—F. D. Shoemaker
Attorney, Agent, or Firm—Flynn & Frishauf

[57] ABSTRACT

For ease of construction, maintenance and repair of piston rods for high power internal combustion engines, particularly large Diesel engines, the piston rod is made of at least three composite parts, one of them being formed with the bearings for the piston pin, and the second and third parts being formed with matching portions to provide a bearing for the crankshaft, the first and second parts being connected and having a junction plane that has matching, fitting contact surfaces located approximately in the middle between the axes of the piston pin and the crankshaft, and being secured together by screws located circumferentially around the matching fitting contact surfaces, for example by engaging lateral projections formed on the first and second parts and surrounding the power-transmitting portion, and engaging power-transmitting surfaces of the parts of the piston rod.

7 Claims, 3 Drawing Figures

COMPOSITE PISTON ROD FOR HIGH POWER RECIPROCATING ENGINES

The present invention relates to a composite piston rod for reciprocating engines, and more particularly for internal combustion reciprocating engines, especially high-powered Diesel engines.

The piston rods used in large, high-power Diesel engines may consist of more than a single casting, transferring power from the piston pin of the piston to the crankshaft of the engine. A three-portion piston rod has been proposed (see German Patent 1,130,229) in which a separating surface is formed approximately intermediate the crankshaft bearing of the piston rod and a second separating surface is formed just above this bearing itself. It has been found that a subdivision of the piston rod into a number of parts is desirable, particularly from the point of view of maintenance and construction; the type of sub-division, however, heretofore used results in an undesirable stress distribution in the lower portion of the piston rod. The separating surface is highly loaded, the surface area itself being reduced by the clamping screws to hold the assembly together. It is also difficult to remove the piston, to which the upper portion of the piston rod is connected, either from the bottom, or from the top of the cylinder since it is necessary to remove the piston together with the comparatively long upper portion of the piston rod from the cylinder as a unit.

It is an object of the present invention to provide a composite piston rod for cylinder-piston reciprocating engines, and more particularly for high power Diesel engines, which has long life, is easy to assemble and disassemble, permits simple assembly and dis-assembly of the piston itself, and which can transmit substantial forces, and thus the high power of the engine, without deterioration or damage.

SUBJECT MATTER OF THE PRESENT INVENTION

Briefly, the separating surface of the composite piston rod is formed approximately in the middle between the crankshaft bearing and the piston pin bearing of the piston rod, the composite parts being secured together by screws which surround the separating surface, for example by enging projections, or lateral bosses formed at the respective parts. Forces resulting in operation of the engine can thus be transmitted directly across the separating surfaces of the piston rod, and the laterally surrounding clamping bolts or screws permit easy disassembly.

Figure 1A:
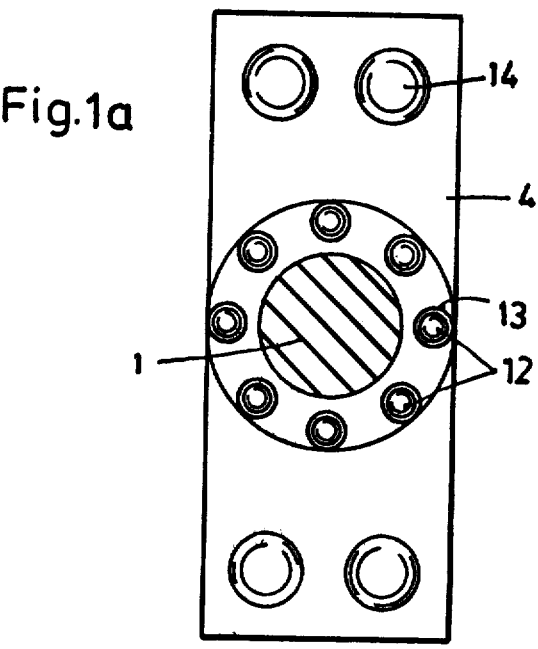
Figure 1B:
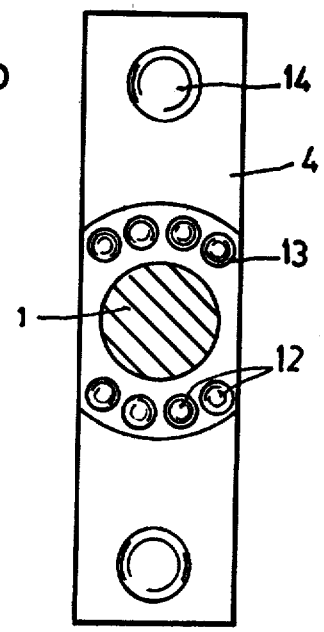

The invention will be described by way of example with reference to the accompanying drawing, wherein FIG. 1 shows a side view of the composite piston rod in accordance with the present invention;

and FIGS. 1a and 1b alternate embodiments, in section, along line 1—1 of the Figure.

The piston rod has three parts, an upper part 1 with a piston pin bearing 2, an intermediate part 3 which also includes the upper half 4 of the crankshaft bearing 5, and a bottom part 6 which has a semi-circular groove, to complete the crankshaft bearing 5. The intermediate part 3 is formed with two separating surfaces 7, 8; these separating surfaces 7, 8 extend transversely to the central axis A—A of the piston rod, and separate the intermediate part 3 from the upper part 1, and the bottom part 6, respectively. The separating surface 7 is located to be approximately midway between the horizontal axis of the crankshaft bearing 5 and the horizontal axis of the piston pin bearing 2. Thus, the parts 1, 3 are approximately of equal length, although part 1 may be slightly longer since it includes the entirety of the piston pin bearing 2, whereas part 3 includes only the upper half 4 of the bearing 5 for the crankshaft. The exact location of the separating surface 7, with respect to the distance between the centers of the bearings 2, 5, is not critical; a location approximately in the middle between the axes of the bearings 2, 5 is preferred.

Lateral bosses, or projections 9, 10 are formed on the respective parts 1, 3 in the region of the separating surface 7. These projections surround the piston rod parts 1, 3 and may be a complete encircling ring, or may be formed as projecting ridges. Screw threads 11 are formed in the projection 10 to receive screws or bolts 12. Bolts 12 pass through bores formed in the projection 9, and the parts 1, 3 are securely clamped together by holding nuts 13. The bolts 12 are preferably located in uniform circumferential distance surrounding the piston rod parts 1, 3. Eight screws 12 may be used, for example. In the drawing, only the left screw 12 is shown in complete representation. The number of screws or bolts surrounding the piston rod is not critical, but less than six may not provide the proper clamping pressure.

The bottom bearing half 6 is secured to the upper bearing half 4 of the crankshaft bearing 5 by screws or bolts 14. Bolts 14 pass through bores formed in the two bearing halves 4, 6, and are securely held in threads 15 cut into the upper bearing half 4, forming part of the intermediate piston rod part 3. The free ends of bolts 14 have nuts 16 screwed thereon, in order to clamp the bearing halves 4, 6 securely together. The screws or bolts 12, 14 are preferably made of a high tensile strength material to permit high loading in axial tension, to clamp the parts of the piston rods tightly and securely together.

The piston rod in accordance with the present invention has several advantages. If used for high powered engines, such as Diesel engines, the entire piston rod can be heavy and large. Making the piston rod in various parts or sections permits machining with comparatively small machine tools, on which high precision is readily obtainable. Subdividing the piston rod in various parts with the screws or bolts 12 surrounding the piston rod as such, permits location of the bolts 12 beyond, and laterally of the force transfer, that is, the stress transfer acting on the piston rod upon operation of the engine. Stresses are transmitted essentially in line with the axis A—A as shown by chain dotted lines S. The bolts 12 extend essentially parallel to this axis, thus removing any loading on the bolts 12 due to transfer of forces in engine operation, and during the power stroke of the piston. This reduces the loading on the bolts 12. The parts 1, 3 themselves have lesser weight, each, than a single piston rod; the bolts 12 are not highly loaded anymore, since the lesser weight of the parts 1, 3 reduces the inertia force acting at the junction line 7. Similar considerations apply to the separating surface 8, and bolts 14. Bolts with comparatively small diameter can be used, permitting use of a larger number of bolts laterally of the piston rod. At least six bolts are used, preferably eight, or more. Using smaller bolts facilitates assembly and dis-assembly, and further permits tightening of the bolts to design torques which are less for smaller diamter bolts. Reducing the diameter of the bolts has the advantage that, given equal length, the bolts are more elastic. There is less danger of damage to the entire assembly if one of the bolts should not be properly tightened, or should loosen under operation than if a lesser number of bolts were provided.

The structure, as shown, permits design of the upper bearing portion 4 to be shaped in such a manner that it not only is stiff, but also has a form suitable for transfer of forces from the piston pin bearing 2 to the crankshaft bearing 5. The transition region between the piston rod part 3, itself, and the bearing portion 4 thereof is highly stressed, and the construction permits locating the clamping bolts 14 laterally of the region where forces are being transferred, that is, the highly loaded transition region is free from interrupting bores and threads. The dimension of the material above the bearing 5 can be selected in accordance with design requirements and not in accordance with machining possibilities. Thus, the bearing can be highly resistant to deformation, since stresses can be absorbed by suitable shaping of the bearing parts. The separating surface 7 is located at such a distance from the crankshaft bearing 5 that the deformation forces tending to act on the bearing 5 will no longer have any effect on the separating surface 7, so that the separating surface 7 will not be subject to wear and tear, and particularly to rubbing or sliding deformation, which might lead to corrosion due to improper fit at the separating surface itself. The separating surface 7 need transfer only compressive forces, and therefore does not need to be larger than the cross-sectional area of the adjacent parts 1, 3 of the piston rod. Given a certain size and number of bolts 12, it is thus possible to provide a clamping force between the parts 1, 3, which is higher than that in previously used arrangements in which the separating surface is differently located and differently arranged with respect to the composite parts. This, further, contributes to resistance against the formation of corrosion, or any weakening of the materials at the separating surface 7. Equal considerations apply for the separating surface 8.

The arrangement in accordance with the present invention permits ready dis-assembly of the piston. If, for example, the piston is to be removed upwardly, bolts 12 can be loosened, thus reducing the length of the piston rod remaining coupled to the piston by about half. A smaller space to remove the piston from above is therefore needed. It is also possible to remove the piston without loosening the crankshaft bearing at all. This substantially simplifies maintenance and permits removal of the piston upwardly through the head of the cylinder. This is of particular advantage in very large Diesel engines, where the crankshaft bearing 5 may be so large that it cannot be removed through the cylinder. Nevertheless, the piston with the upper portion 1 of the piston rod attached thereto, after loosening and removal of bolts 12, can be removed through the head of the cylinder.

We claim:

1. Composite piston rod for highly loaded pistons comprising
   at least three composite parts (1, 3, 6), one of the parts (1) being formed with bearing means (2) for a piston pin;
   the second and third parts (3, 6) being formed with portions of the bearing means (4, 5) for the crankshaft;
   said first and second parts being formed at their junction with matching, fitting contact surfaces (7) located approximately in the middle between the axes of the piston pin bearing and the crankshaft bearing, and extending essentially transverse to the center line (A—A) passing through the bearing pin and the crankshaft;
   and separable screw means (12, 13) surrounding the matching, fitting contact surfaces (7) and located circumferentially with respect to the first and second piston rod parts.

2. Piston rod according to claim 1, wherein the first part wholly includes the piston pin bearing;
   the second (3, 4) and third (6) parts including, each, half of the crankshaft bearing;
   and a separating contact surface (8) is formed between the second and third parts in the region of said parts adjacent the bearing halves.

3. Piston rod according to claim 1, wherein the matching, fitting contact surface (7) is perpendicular to the piston rod axis (A—A).

4. Piston rod according to claim 1, wherein the first and second parts (1, 3), in the region of the contacting surface (7) are formed, each, with laterally surrounding projecting means (9, 10) and the screw means (12, 13) are engaged in said projecting means.

5. Piston rod according to claim 2, further comprising separable crankshaft bearing screw means (15, 16) clamping the separable contacting surface (8) together and holding said bearing halves in clamped engagement to surround the crankshaft bearing.

6. Piston rod according to claim 5, wherein at least one of the screw means (12, 13; 15, 16) are made of a material capable of accepting high tensile stress.

7. Piston rod according to claim 4, wherein at least six screw means (12, 13) are provided, located circumferentially around the piston rod.

* * * * *